Feb. 12, 1963     C. F. WENDENBURG     3,077,573
SEISMOGRAPHIC APPARATUS AND METHOD
Filed June 7, 1957     9 Sheets-Sheet 1

INVENTORS
CLARENCE FREDERICK
WENDENBURG
BY
Leland R. Chapman
ATTORNEY

Feb. 12, 1963   C. F. WENDENBURG   3,077,573
SEISMOGRAPHIC APPARATUS AND METHOD
Filed June 7, 1957   9 Sheets-Sheet 2

INVENTORS
CLARENCE
FREDERICK
WENDENBURG
BY
ATTORNEY

Feb. 12, 1963  C. F. WENDENBURG  3,077,573
SEISMOGRAPHIC APPARATUS AND METHOD
Filed June 7, 1957  9 Sheets-Sheet 3

INVENTOR*S*
CLARENCE
FREDERICK
WENDENBURG
BY *Leland R. Chapman*
ATTORNEY

Feb. 12, 1963  C. F. WENDENBURG  3,077,573
SEISMOGRAPHIC APPARATUS AND METHOD
Filed June 7, 1957  9 Sheets-Sheet 4

INVENTORS
CLARENCE
FREDERICK WENDENBURG
BY
Leland R. Chapman
ATTORNEY

Feb. 12, 1963   C. F. WENDENBURG   3,077,573
SEISMOGRAPHIC APPARATUS AND METHOD
Filed June 7, 1957   9 Sheets-Sheet 5

INVENTORS
CLARENCE
FREDERICK
WENDENBURG
BY
ATTORNEY

Feb. 12, 1963   C. F. WENDENBURG   3,077,573
SEISMOGRAPHIC APPARATUS AND METHOD
Filed June 7, 1957                                             9 Sheets-Sheet 6

INVENTORS
CLARENCE FREDERICK
WENDENBURG
BY
Leland R. Chapman
ATTORNEY

Feb. 12, 1963 C. F. WENDENBURG 3,077,573
SEISMOGRAPHIC APPARATUS AND METHOD
Filed June 7, 1957 9 Sheets-Sheet 7
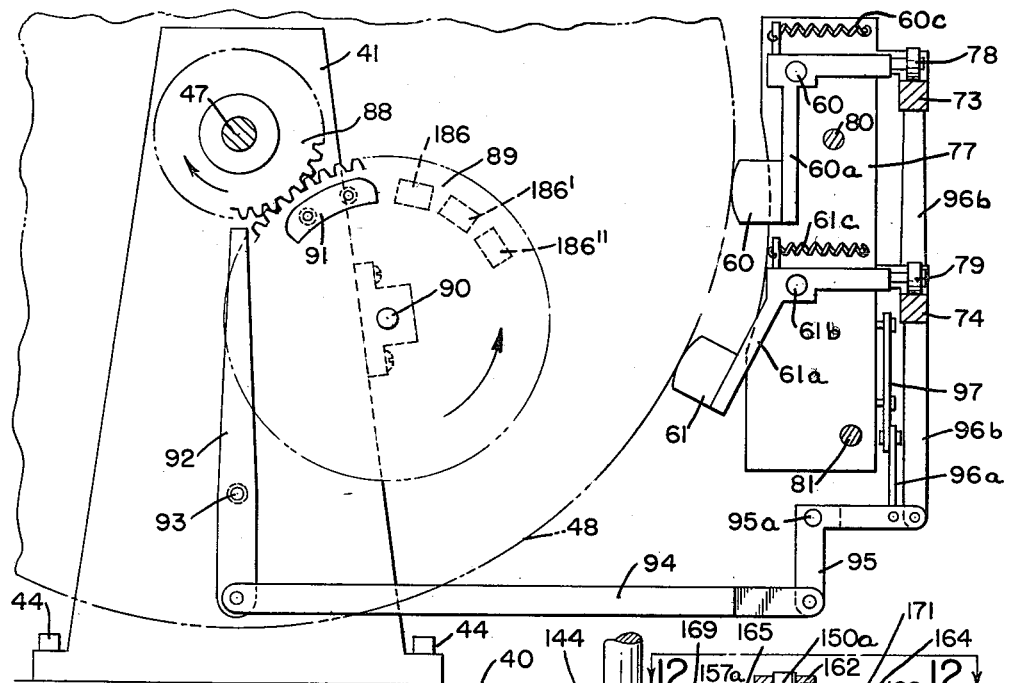
FIG. 10
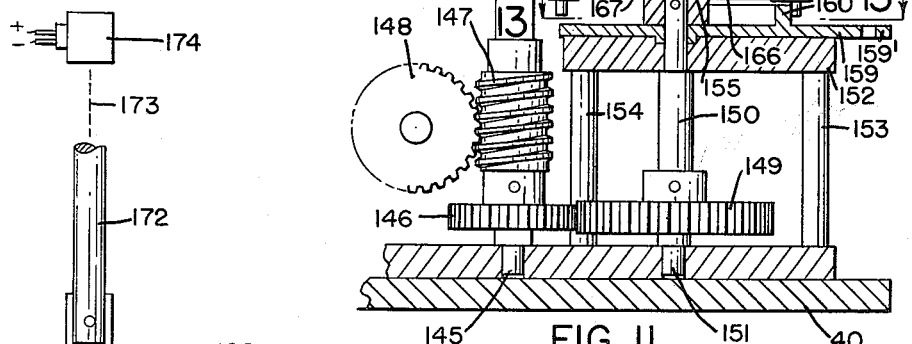
FIG. 11
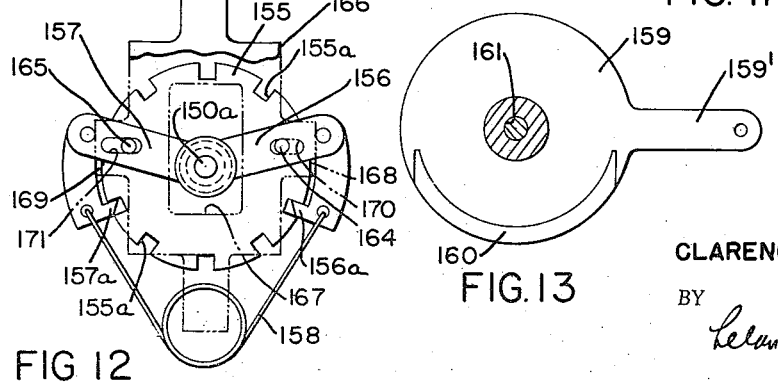
FIG 12
FIG. 13
INVENTORS
CLARENCE FREDERICK
WENDENBURG
BY
Leland R. Chapman
ATTORNEY Feb. 12, 1963    C. F. WENDENBURG    3,077,573
SEISMOGRAPHIC APPARATUS AND METHOD
Filed June 7, 1957    9 Sheets-Sheet 9

INVENTOR
CLARENCE FREDERICK
WENDENBURG
BY
Leland R. Chapman
ATTORNEY

United States Patent Office 3,077,573
Patented Feb. 12, 1963

3,077,573
SEISMOGRAPHIC APPARATUS AND METHOD
Clarence Frederick Wendenburg, Houston, Tex., assignor to Sohio Petroleum Company, Cleveland, Ohio, a corporation of Ohio
Filed June 7, 1957, Ser. No. 664,241
8 Claims. (Cl. 340—15)

This invention relates to the general field of geophysical or seismic prospecting. More particularly, the invention relates to a method and apparatus for analyzing, modifying, or correcting data obtained in such prospecting.

In the usual method of reflection seismic prospecting, an artificial seismic disturbance is created by a small charge of explosive detonated below the surface of the earth, and a record is made of the responses of a number of seismometers placed in an advantageous pattern near the shot hole. They are actuated by the refracted and reflected waves produced by the explosion, propagated by the earth and modified by the strata below and each produces a trace on a common time axis of the reverberations sensed. From the interval between the explosion and the actuation of the seismometers by the reflected waves, from the intervals between actuation of the respective seismometers, and from information as to velocity of energy propagation in the given media, the depths and dips of the reflecting strata can be determined in a manner well known to the art.

Usually, the seismometers are spaced different distances from the location of the shot so that energy reflected from a given reflecting horizon arrives at the different seismometers at different times, resulting in a perceptible phasing or time differential between corresponding signal portions of the different seismic traces. These time shifts to the extent they are caused by the different spacings of the seismometers from the explosion, are commonly referred to as "normal moveout" and they tend to mask otherwise pertinent relationships between corresponding signal portions of the traces, thus making it difficult to accurately determine the presence of reflecting horizons and their geological character.

While the need for the introduction into seismic records of corrective compensation for moveout has long been recognized, existing seismic equipment made such compensation difficult to effect in practice. However, the development of electronic recording, such as magnetic tape recording, has resulted in important changes in the techniques of gathering, storing, and using intelligence representative of geophysical or seismic properties. In theory, corrective compensations can be introduced into a seismic record by modulating the electrical signals as a function of time through the expedient of imposing predetermined relative motions between the several recording and playback heads and the magnetic tape. Attempts to apply modulating or corrective information in this manner to the magnetically cast records of seismic operations have not, however, been altogether successful. The nature of a typical seismic record, taking the form of a plurality of say twelve or more recorded parallel traces closely packed side by side, along the length of a broad magnetic tape, creates the difficult problem of establishing noninterfering or intermodulation-free motions to the cluster of recording and playback heads. Moreover, because each trace of a typical seismic record requires its own unique corrective factor, itself nonlinear over the length of any given trace, the corrective motions are necessarily complex and therefore difficult to attain.

Accordingly, it is an object of my invention to provide a method and apparatus to correct reproducible seismic records for such inherent and troublesome distortions as moveout error.

Other features and advantages of my method and apparatus formed in accordance with my invention can best be understood from a consideration of the following description taken in connection with the accompanying drawings in which.

Figure 3:
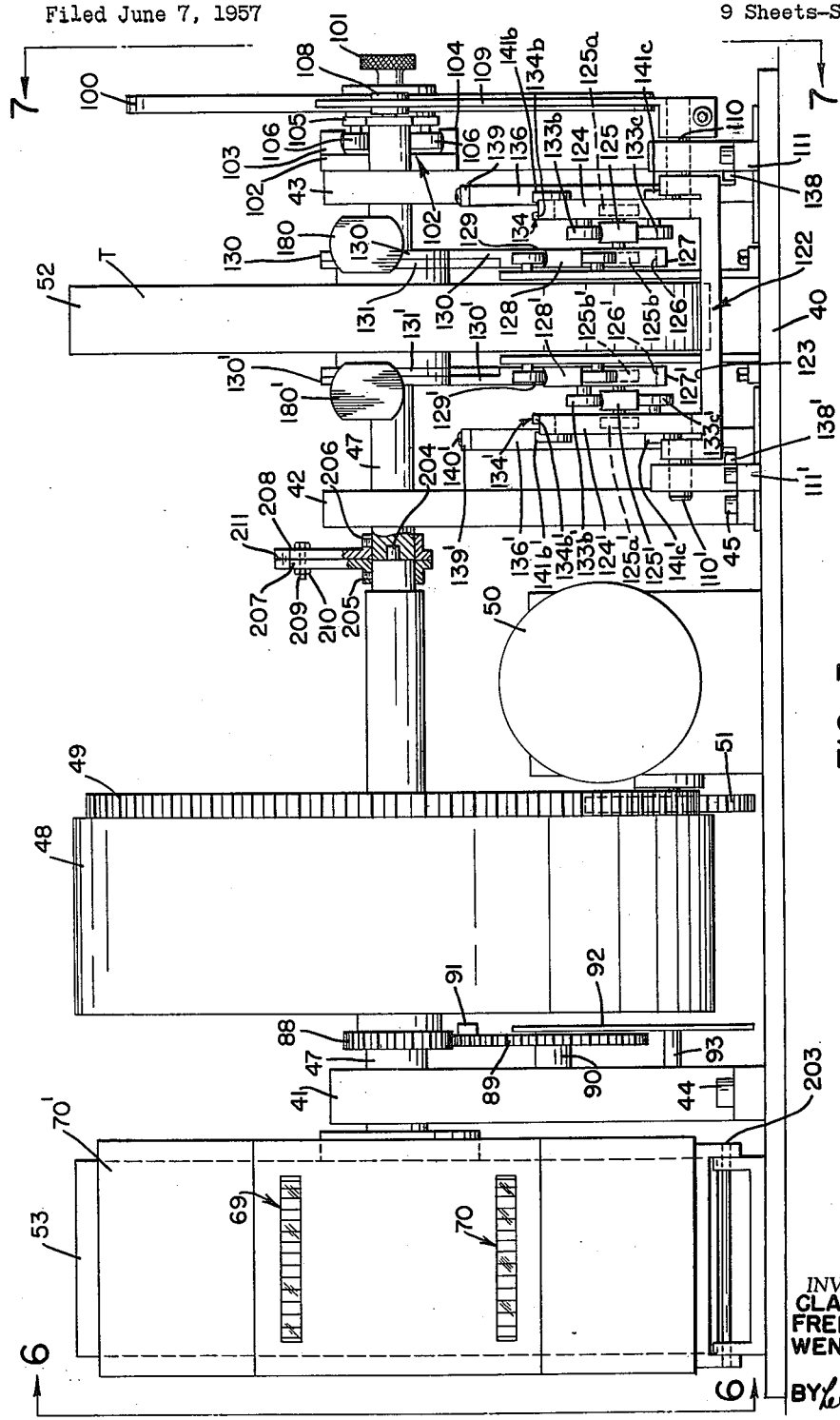
FIGURE 3 is a view in front elevation of the apparatus.
Figure 4:
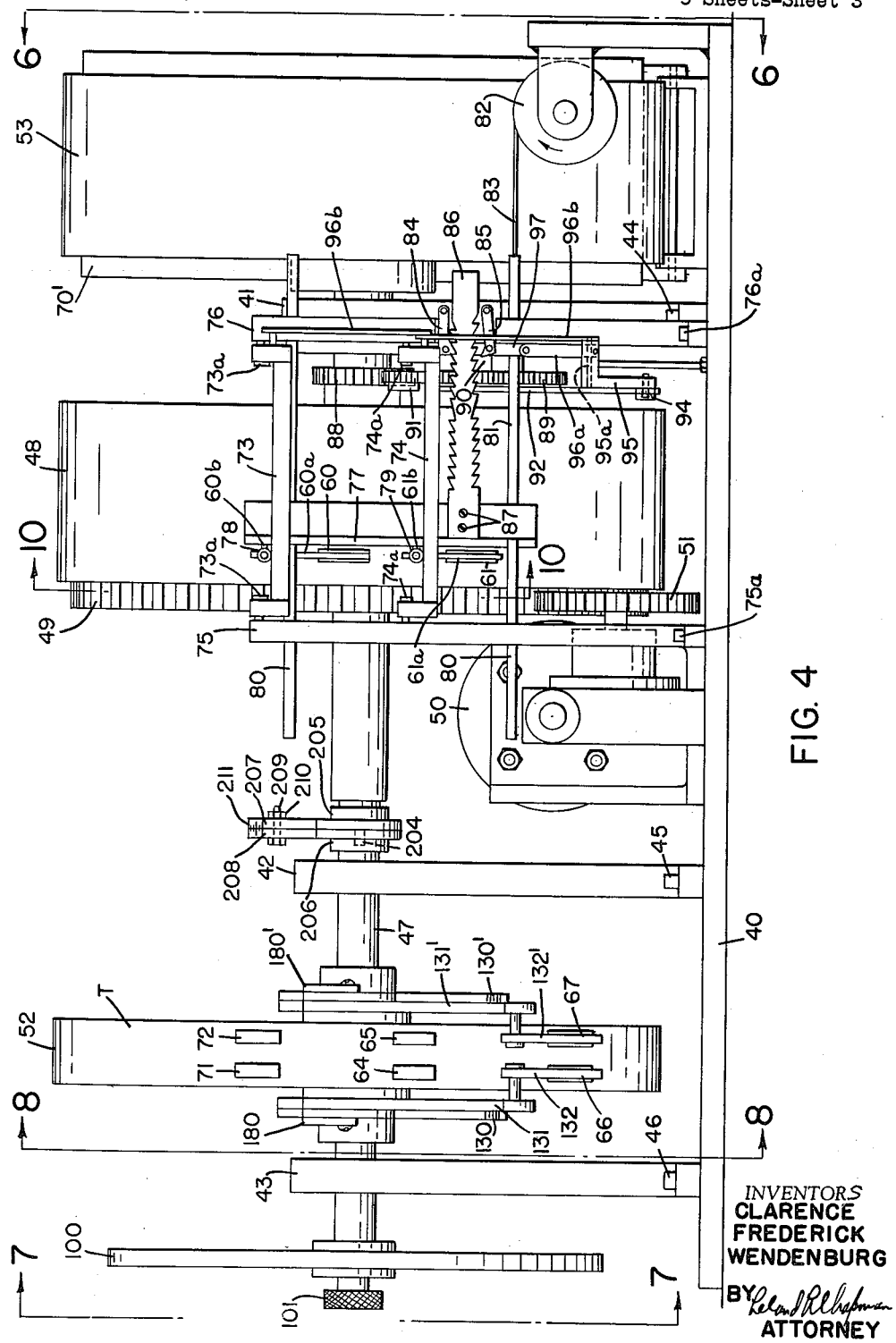
FIGURE 4 is similarly a view in back elevation of the apparatus with certain details omitted for simplification.
Figure 5:
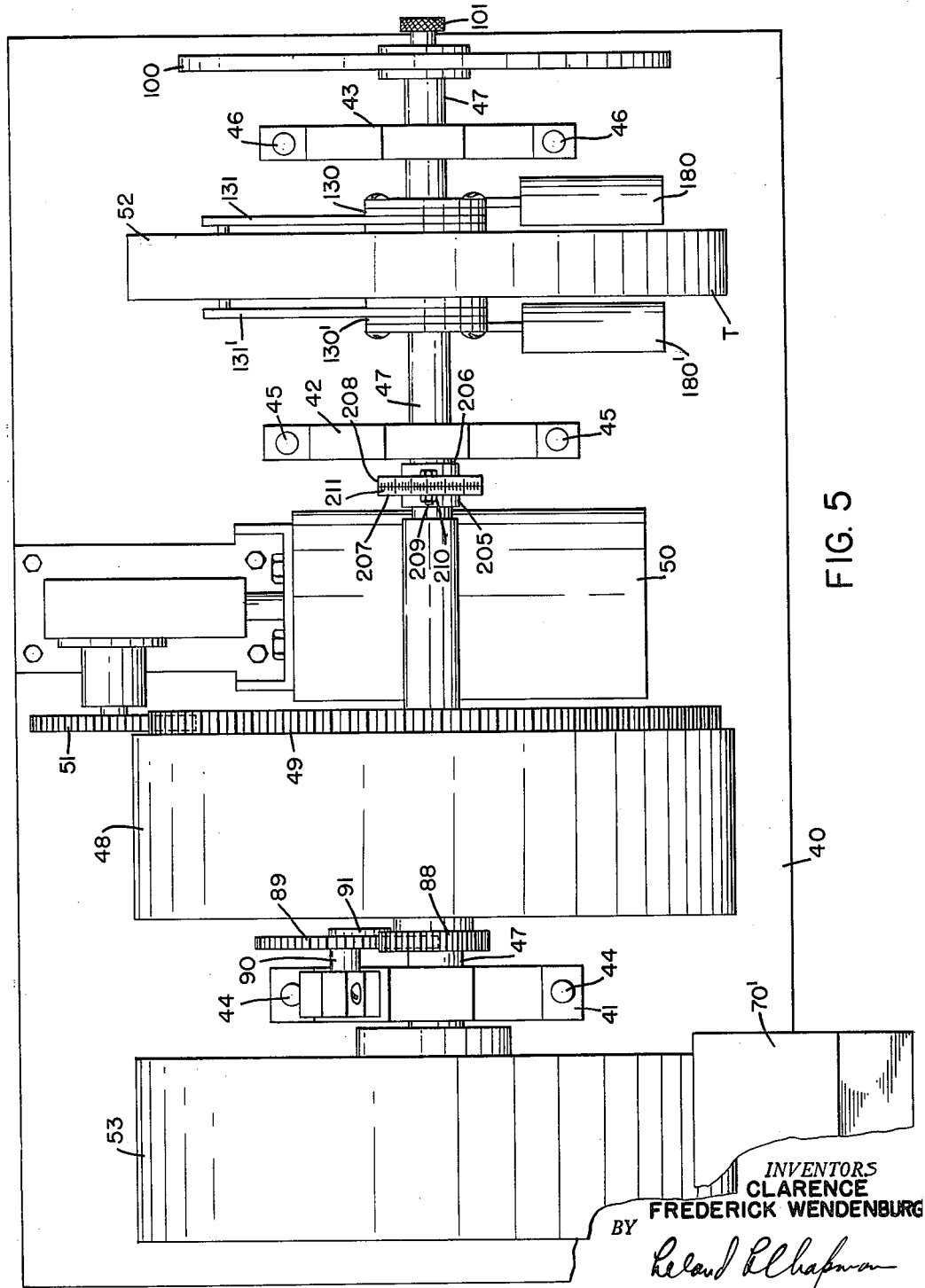
FIGURE 5 is a top view of the apparatus.
Figure 6:
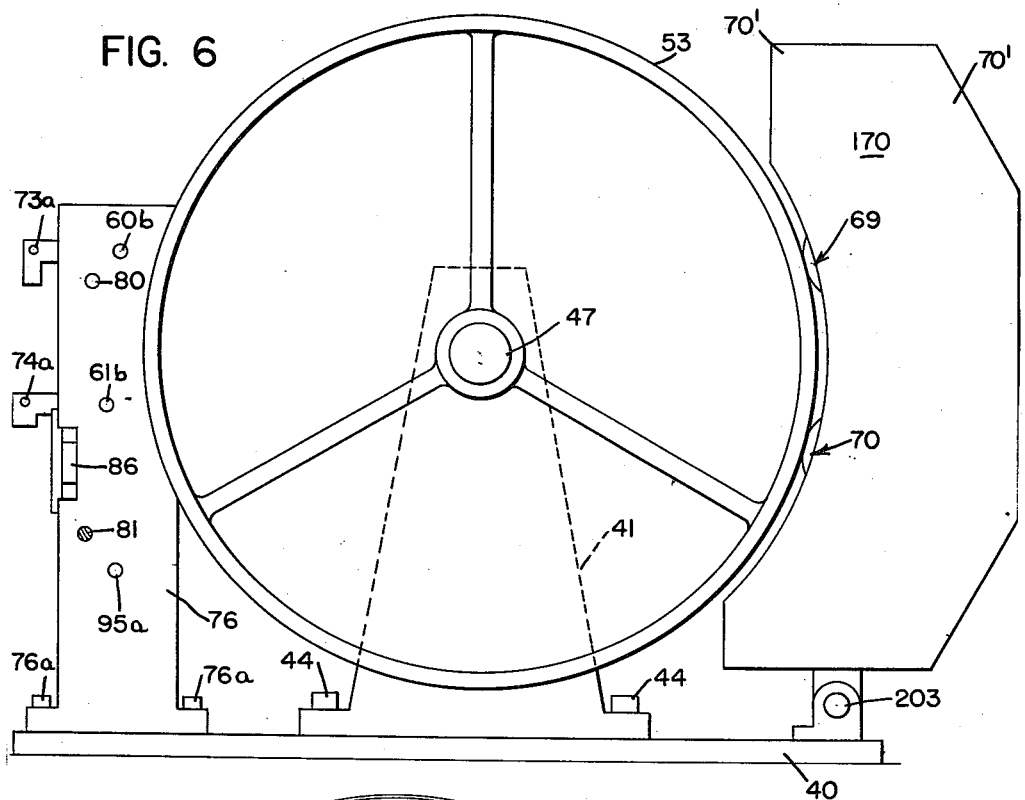
FIGURE 6 is an elevational view of the lefthand end of the apparatus taken on line 6—6 of FIGURES 3 and 4.
Figure 7:
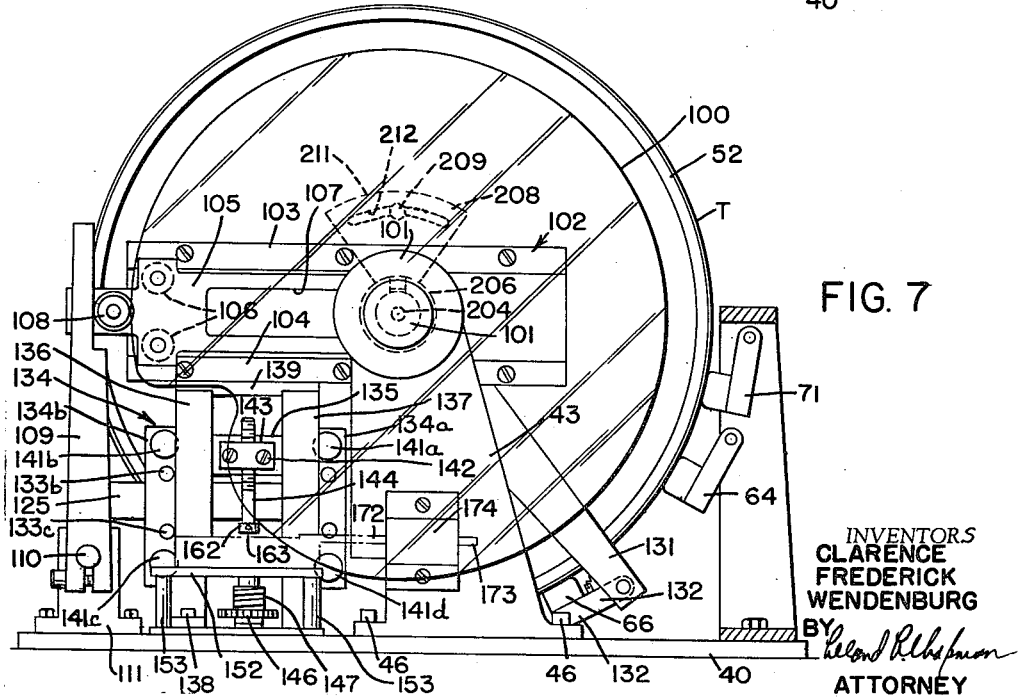
Figure 8:
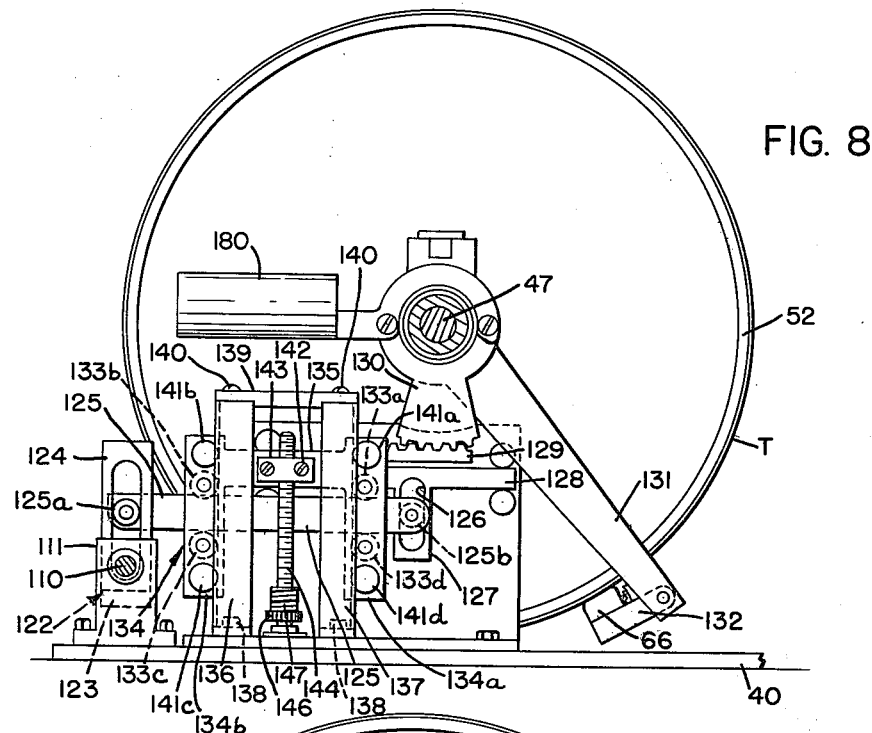
Figure 9:
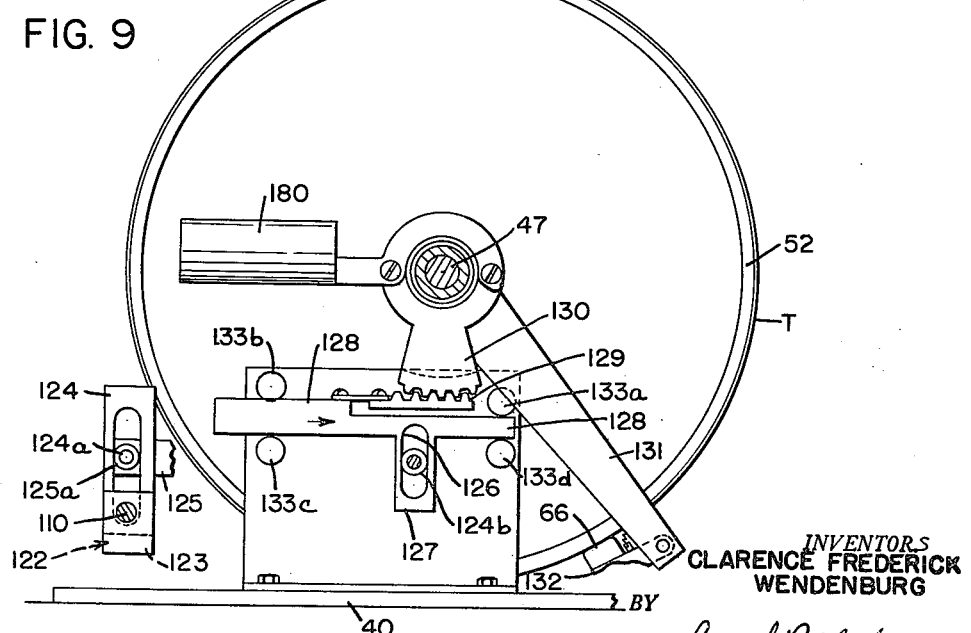
Figure 14:
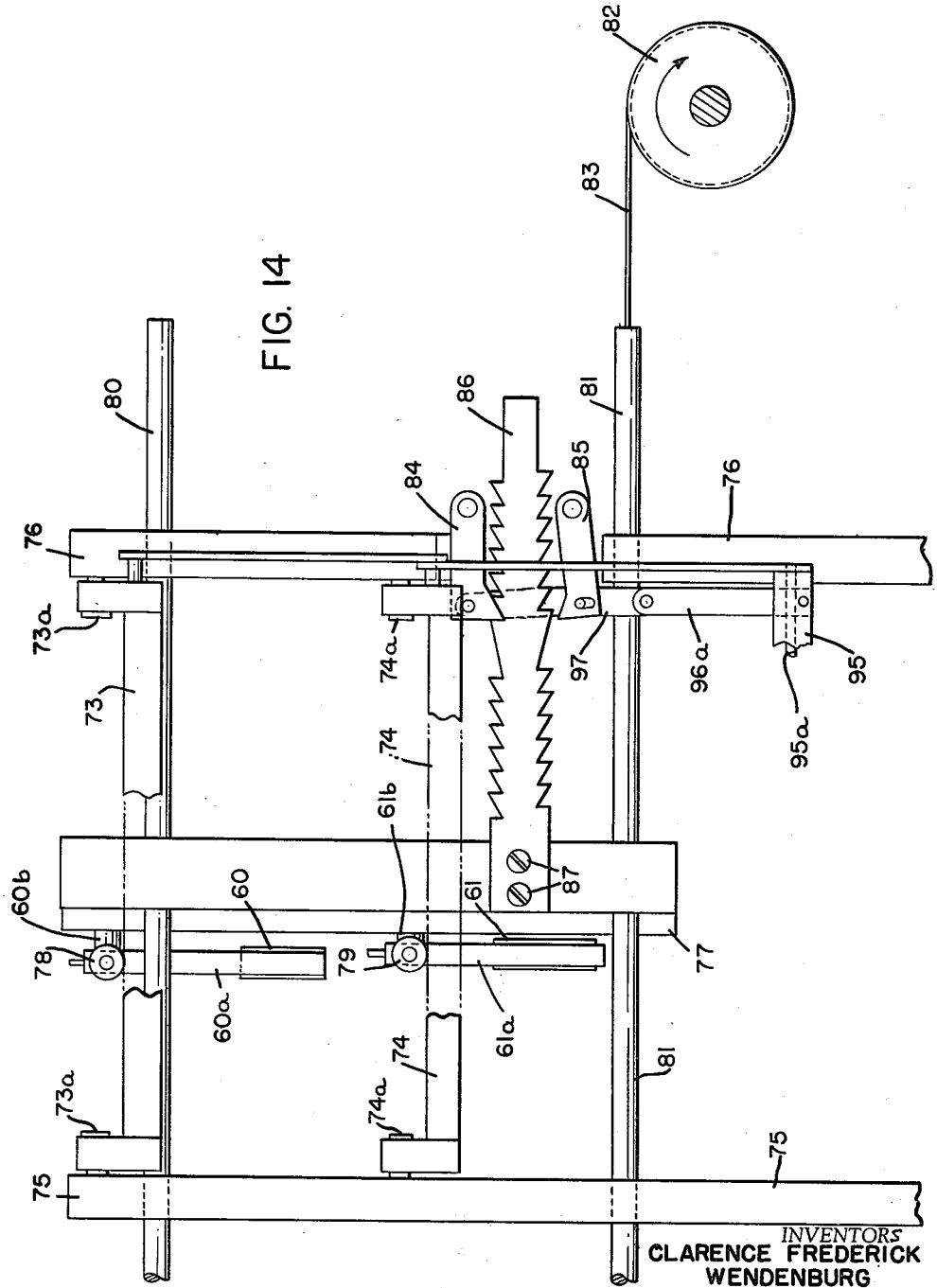
Figure 15:
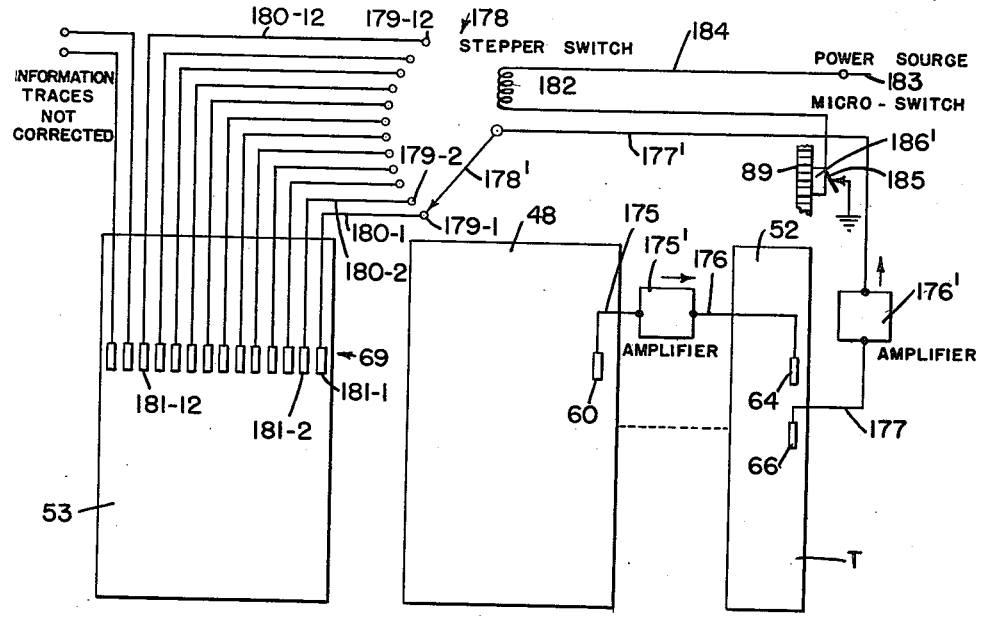
Figure 16:
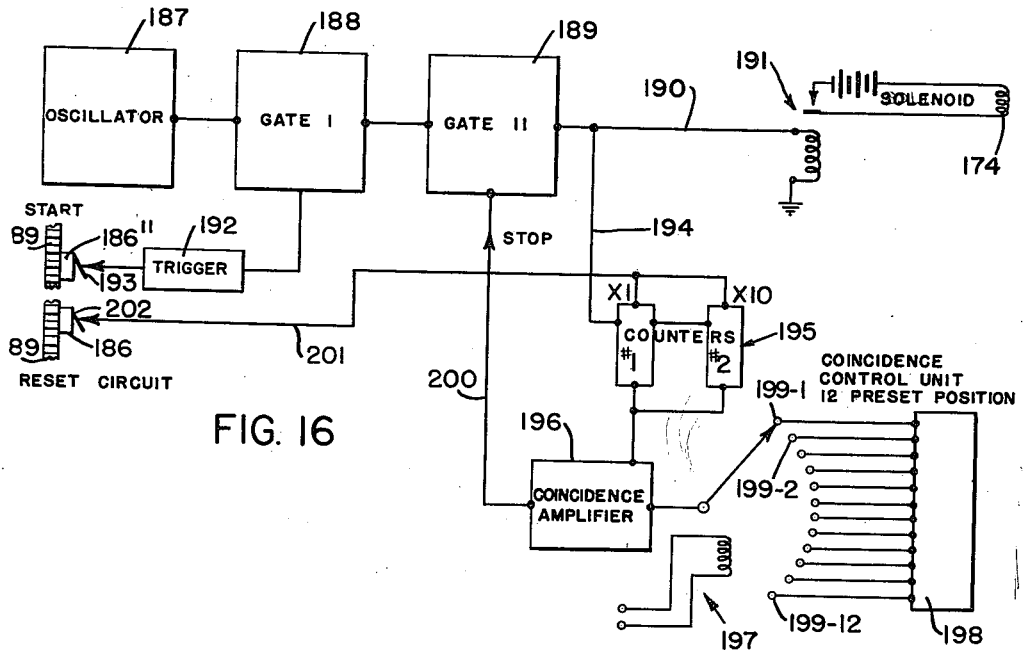

FIGURE 7 is an elevational view of the righthand end of the apparatus taken on line 7—7 of FIGURES 3 and 4 with additional structure not shown in FIGURES 4 and 5;

FIGURE 8 is a view, in vertical section, taken approximately on line 8—8 of FIGURE 4 looking in the direction of the arrows and with additional structure not shown in FIGURE 7;

FIGURE 9 is a fragmentary view in vertical section similar to FIGURE 8 with additional parts broken away;

FIGURE 10 is an enlarged fragmentary view in vertical section of a portion of the structure taken generally on the line 10—10 of FIGURE 4 looking in the direction of the arrows;

FIGURE 11 is an enlarged view, partly in vertical section and partly in elevation, showing details of the structure shown more generally in FIGURE 7;

FIGURE 12 is a view in horizontal section taken on the line 12—12 of FIGURE 11, looking in the direction of the arrows;

FIGURE 13 is a view in horizontal section taken on the line 13—13 of FIGURE 11 looking in the direction of the arrows;

FIGURE 14 is an enlarged view of a portion of the apparatus also shown in FIGURES 4 and 10;

FIGURE 15 is a schematic diagram of a portion of the electrical circuit in the apparatus; and FIGURE 16 is a schematic, block-type diagram of a control circuit in the apparatus.

Figure 1:
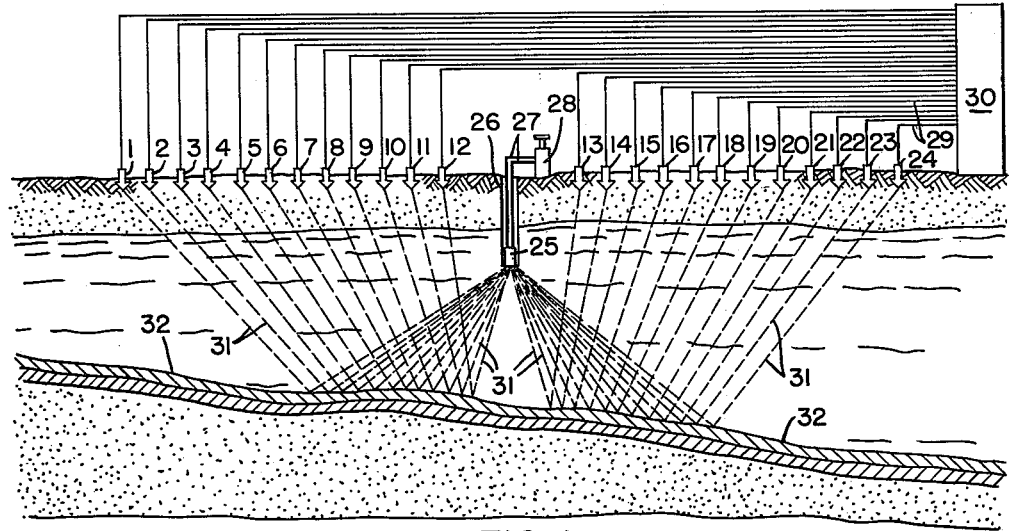
FIGURE 1 is a diagrammatic view showing a portion in section of the earth's crust, a shot hole, an array of seismometers, the recording station, and the paths of certain seismic waves which actuate the seismometers.

Referring now to FIG. 1, there is shown a schematic and simplified arrangement for making a seismic recording. A charge of explosive 25 for establishing an artificial seismic disturbance is placed in a hole 26, drilled in the earth. Wires 27 connect the explosive to a detonator 28. A series of seismometers 1 to 24 are placed on the earth's surface. Other numbers can be used, but for illustration purposes I have shown a series of 12 on a line on each side of the shot hole. The seismometers are connected by wires 29 to a recorder 30.

When the explosive is set off a series of seismic waves 31 are sent out which strike a reflecting bed 32 in the earth's formation. It is obvious from this figure, taking into account the finite velocity of shock waves in a given medium, that the waves will not arrive at all twelve seismometers on each side at exactly the same time, but that the units 12 and 13, closest to the disturbance source, will be actuated first, and there will be a definite short time interval before the reflected waves from bed 32 will actuate, sequentially, the seismometers 1 to 11 and 14 to 24. It will take the longest time to actuate the seismometer farthest away, i.e., seismometers 1 and 24. Assuming a horizontal reflective layer, the anticipated difference in time between actuation of the first and each succeeding seismometer is known as the normal moveout, a factor which distorts the appearance of the seismic record so that the geometry of the sub-surface strata, including the critical faults and dips, are more difficult to detect through the various analyzing techniques known in the art. The moveout error, in addition to being a function of the distance between the shot hole and the seismometers, is a function of the depth, and disappears, for all practical purposes, for the reflective strata very deep in the earth's surface.

Figure 2:
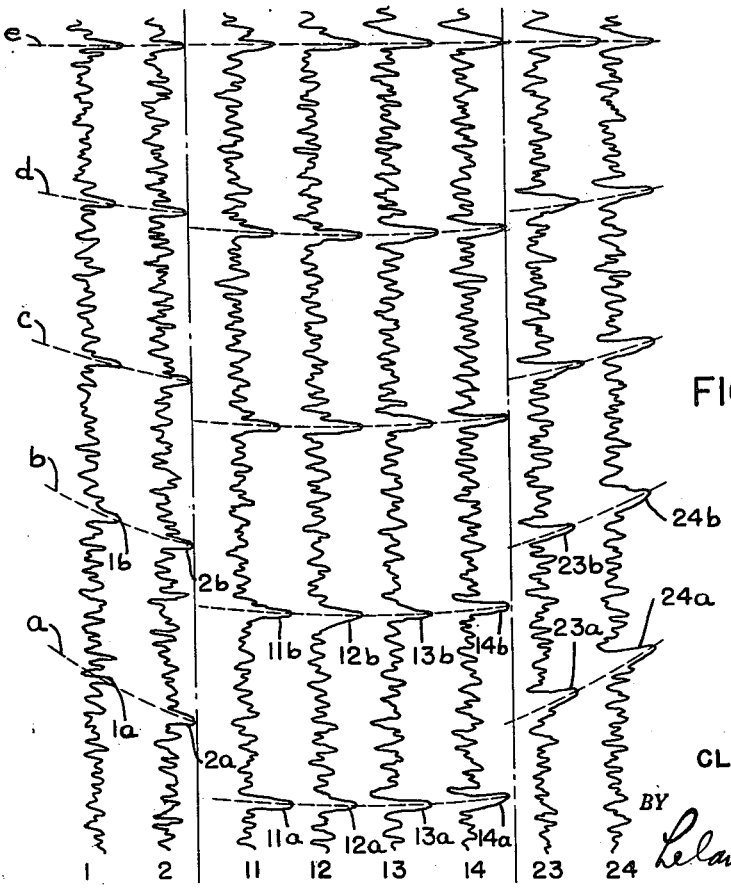
FIGURE 2 is a series of curves representing a portion of a seismic record and illustrating the effect of normal moveout.

To aid in understanding the considerations involved in normal moveout, and the application of this invention to this problem, FIG. 2 illustrates a selected few curves representing seismic traces obtained in a representative seismic prospecting operation. The different traces are identified as traces 1, 2, 11, 12, 13, 14, 23 and 24, and each represents the output of a correspondingly numbered seismometer plotted as a function of time. It will be observed that traces 3 through 10 and 15 through 22 have been omitted from the FIGURE for simplification.

All of the traces have similar first peak portions $1a$, $2a$, $11a$, $12a$, $13a$, $14a$, $23a$ and $24a$ representing reflections of energy from a given shallow reflecting horizon such as that identified by the numeral 32 in FIGURE 1. It will be noted that the positions of these first peaks are shifted relative to each other along the time axis of the record, these time shifts corresponding to the normal moveout times for this reflection. It will be further noted that the time shifts between the peaks of the different traces follow a nonlinear pattern, as shown by the dotted line $a$ running through these peaks and that the peak $1a$, at the upper extreme of the sloping first stratum 32, is phased relatively to the peak $24a$ by an amount representing the stratum slope.

Each of the seismic traces also has a second peak $1b$, $2b$, $11b$, $12b$, $13b$, $14b$, $23b$ and $24b$ at a subsequent time in the record, corresponding to receipt by the different seismometers of energy from a second reflecting horizon (not shown in FIGURE 1). These peaks are shifted relative to each other along the time axis in a nonlinear fashion, although the total time shift between peaks $1b$ and $12b$ and between the peaks $13b$ and $24b$ is not as great as it is for the first reflections represented by peaks $1a$ through $12a$ and $13a$ through $24a$. The dotted line $b$ running through peaks $1b$ and $12b$ illustrates that the normal moveout correction for this particular reflection is also nonlinear and different from the moveout correction represented by dotted line through peaks $1a$ through $12a$. Additional subsequent common peaks in the records and the corresponding dotted lines $c$, $d$, and $e$ therethrough indicating the normal moveout function are illustrated in the traces to show that the normal moveout time variations decrease as the record progresses until the normal moveout variations are substantially zero when the differences in the relatively larger travel paths to the different seismometers become negligible. In other words, as the reflection comes from a very deep stratum, the differences in time to reach the several seismometers approach zero.

The fact that the dotted lines connecting the corresponding peaks of reflections from the several strata are nonlinear and that they are differently nonlinear with each stratum tends to obscure the record and makes the interpretation difficult.

Accordingly, it is the object of my invention more particularly to correct the traces of a seismic trace record so that all of the peaks for a given reflection will lie on a line representing characteristics of the reflecting stratum. As a result, the various dotted lines through the peaks, as shown in FIGURE 2, with all appear as straight lines in the corrected record, assuming the reflecting strata to have been correspondingly straight. When so corrected, the traces are more easily analyzed to locate the depth, slope, faults, and other characteristics of the strata from which the reflections come.

Although, for the purposes of clarity of illustration, the seismic record illustrated in FIG. 2 has been idealized to show fairly pronounced peaks with a minimum of extraneous energy or noise, it will be understood that, in practice, considerable noise may be present in seismic traces, and that visual alignment of the traces is usually not as distinct as shown. There are other fixed factors attributable to differential weathering and elevation which affect each trace and in a different manner and these must be corrected for by means known in the art which is not a part of this invention.

The seismic records can be produced by any reproducible recording medium such as light traces on a photographic film or magnetic traces on a magnetic tape. My invention is particularly adapted to a recording of the traces on magnetic tape and its application using this recording technique will be described hereinafter.

In certain of the field recorders, such as that identified by the numeral 30, one series of traces on one side of the slot hole, such as traces 1 through 12, are more or less evenly spaced across the full width of tape and the other traces 13 to 24, on the other side of the hole, are recorded in between the traces 1 to 12. Thus, the order may be 1, 13, 2, 14, 3, 15, etc. In addition, the second series of traces may be displaced along the tape so that they begin and end at a different point along the length of the tape than do the first series. Because of this method of recording, I have adapted my machine to correct for such recordings, although it will be understood that all of the traces may be recorded in their proper sequence beginning at the same point in the tape and the modifications required for this will be obvious.

Referring now to FIGURES 3 and 4, which show the front and rear views of some of the larger elements of the apparatus, there is shown a base plate 40 on which supporting posts 41, 42 and 43 are mounted by means of bolts 44, 45 and 46. Journalled in each of these supporting posts 41, 42 and 43, near the tops thereof, is a shaft 47. Mounted on the shaft 47 for rotation therewith is a record-bearing member taking the form of a drum 48 on one side of which is mounted a large gear 49. A motor 50 operating through reducing gear train 51 drives the gear 49, the drum 48 and the shaft 47 at a relatively slow speed of about 5 to 15 rotations per minute. The drum 48 is equipped with conventional fastening means for the purpose of securing a magnetic tape thereto on which is present the original traces that were recorded by the recorder 30 as a result of the seismic field operation described above.

It will be understood various numbers of traces may be present on this tape and two series of twelve traces each have been selected merely for illustrative purposes. Different terrains may require more or fewer traces and these may or may not be symmetrical with respect to the shot hole. For instance, all of the traces may be on one side of the shot hole or they may be unevenly divided and spaced. Irrespective of the number and spacing, the normal moveout is invariably present in the initial recording made in the recorder 30 and can be corrected for, in accordance with my invention.

Also mounted on the shaft 47 and rotating synchronously with the drum 48 is a re-recording or compensating record-bearing number in the form of a drum 52 adapted to have a magnetic tape T (FIGURE 7) secured around its circumference. This drum as shown is of the same diameter but of less width than the drum 48 and has room on it for a tape carrying less than the total number of traces in the recording mounted on the tape of the drum 48. In the illustrative embodiment being described, two traces can be recorded on the tape on drum 52 but if desired a single trace or a larger number of traces, for example, four, can also be recorded.

At the other end of the shaft is a third record-bearing member in the form of a drum 53 mounted for synchronous rotation, and on which is secured a magnetic tape similar in width to that which mounts on drum 48. All three drums 48, 52 and 53 are rotated together at the same speed.

In accordance with the method and apparatus of my invention, one or more of the original seismic traces on the magnetic tape mounted on drum 48, called the field drum because it can be used to carry the original field record, are picked up or played back and re-recorded on drum 52, called the compensating drum. The re-recorded trace on drum 52 is then picked up or played back and recorded on drum 53, which, bearing the final record, is called the final drum. In the recording or playing back on drum 52, correction for normal moveout is made in a manner that will be described in detail below. The recordings on drum 52 are successively repeated on drum 53, and as a result, the recording on drum 53 will be identical with that on drum 48 except that the traces on drum 53 will have been corrected to remove the non-linearity caused by the normal moveout.

The structure for accomplishing this includes two transducers in the form of playback or pick-up heads 60 and 61 mounted adjacent the drum 48. These are of the conventional construction and produce an electrical signal corresponding to the magnetic trace, as is well known in tape recorders. The two playback heads 60 and 61 are positioned so as to be opposite adjacent traces and as the drum makes one rotation, an electrical signal is produced by the playback heads corresponding to the traces in the magnetic tape. These signals are amplified and the amplified signal is then fed to two fixed transducers in the form of recording heads 64 and 65 mounted adjacent the drum 52. Reference is made to FIG. 15, which constitutes a simplified schematic wiring diagram described in detail below, inasmuch as the wiring is omitted from the other figures. The recording heads 64 and 65 record the signal in the magnetic tape mounted on the drum 52.

Two transducers in the form of playback or pick-up heads 66 and 67 are mounted to pick up the signal recorded by the recording heads 64 and 65. The playback heads 66 and 67 are movable relative to the recording heads 64 and 65 in a manner to be described in more detail, and in the preferred arrangement of the invention, it is the movement of the playback heads 66 and 67 during the recording and playback that is responsible for the correction of the normal moveout. The recording heads 64, 65 and the playback heads 66, 67 comprise units of a transducer array for bidirectionally transducing the signals representative of the trace record and the trace record, i.e., converting signals to a trace and back to signals for making a final record. The output from the playback heads 66 and 67 is amplified, and the amplified signal is fed to one of a series of transducers in the form of recording heads, indicated generally by the numerals 69 and 70, which record the corrected signal on the magnetic tape on the recording drum 53 and which are mounted in a common housing 70'. Preferably, one recording head, which can also be used as a pickup or playback head, is provided for each trace and all are accurately mounted with provisions for certain settings or adjustments to correct for the fixed factors mentioned previously and forming no part of the present invention.

Also mounted adjacent the drum 52 are two erasing heads 71 and 72 which act to erase the signal previously recorded and leave the magnetic tape in condition to record the signal from the recording heads 64 and 65 upon the next rotation of the drum 52. The erasing heads can be operated concurrently with the recording and playback heads of the drum 52.

Although the magnetic tape on the drum 48 in the embodiment illustrated contains 24 traces, as mentioned earlier, less than the total are corrected sequentially. For this reason, it is necessary to shift the playback head or heads in a lateral direction across the drum after each pair of traces is recorded. The mechanism for accomplishing this is as follows. This structure is shown in FIGURES 4, 6, 10 and 14.

The playback heads 60 and 61 are secured to supporting bell-crank arms 60a and 61a which are pivotally mounted on a vertical plate 77 by means of pivot pins 60b and 61b. Journaled at the free ends of the bell-crank arms 60a and 61a are rollers 78 and 79 which ride on the upper surfaces of horizontal swinging supports 73 and 74, respectively. The bell-crank arms 60a and 61a are urged in clockwise direction about their pivots by tension springs 60c and 61c, respectively, thereby to insure that the rollers 78 and 79 remain in engagement with the supports 73 and 74. The swinging supports 73 and 74 are respectively pivotally mounted on offset pivotal bearings 73a and 74a in posts 75 and 76 fastened to the base plate by bolts 75a and 76a. The vertical plate 77 is held in position by two horizontal guide rods 80 and 81 secured thereto and which are slidably received in holes in the post 75 and 76 so that said guide rods and plate can slide as one transversely across the recording surface of the drum 48. The guide rods 80 and 81 hold the plate 77 in position and thus maintain the playback heads 60 and 61 in alignment as they are moved across the drum in a transverse direction.

The vertical plate 77 is urged to the right (as shown in FIGURES 4 and 14) by means of a tension reel 82 which exerts tension on a wire 83 attached to the horizontal guide rod 81. Movement in this direction is opposed by controlled, stepping pawls 84 and 85 which coact with a ratchet bar 86 secured to the vertical plate 77 by screws 87.

When the operation is started, the playback heads 60 and 61 are in the left-most position (as viewed in FIGURES 4 and 14) and after every other revolution of the drum 48 they are automatically indexed to the right by means of the actuating mechanism now to be described. The correcting is accomplished during every other revolution, and the revolutions between corrections are employed to index the heads 60 and 61 to the new position and to adjust the mechanism which moves the heads 66 and 67, as will be described in more detail later.

Mounted on the shaft 47 is a gear 88 (FIGS. 3, 4, 5 and 10) which drives a gear 89 mounted on a shaft 90 which is journalled on the supporting post 41. The gear 89 has twice as many teeth as the gear 88 and therefore the gear 89 makes one revolution for each two revolutions of the drum 48. Mounted on the gear 89 is an actuator or striker 91 which engages a follower bar 92 which is pivotally mounted on a pin 93 in the guide post 41. As the striker 91 moves the follower 92 to the left, as viewed in FIGURE 10, it operates a draw bar 94 to rock a bell-crank 95 about its pivot 95a to drive a pair of push links 96a and 96b in an upward direction. The push link 96b is pivotally connected to the swinging supports 73 and 74 to drive them upward, thereby raising the follower rollers 78 and 79 and swinging the playback heads 60 and 61, by means of their bell-crank carriers 60a and 61a, away from the magnetic tape on the drum to inactive positions. In the meantime, by action of the push rod 96a, the heads 60 and 61 are indexed a trace at a time across the drum. Being raised from the tape undue wear due to this lateral movement is prevented.

The swinging of the bell-crank 95 also moves the push link 96a upward, pushing with it a connecting link 97 which acts to move the pawls 84 and 85 upward permitting the ratchet bar 86 to move one-half step to the right under the influence of the tension reel 82. When the follower bar 92 returns to its normal position, the pawls 84 and 85 are lowered to the position shown in FIGURES 4 and 10, whereupon the ratchet bar 86 moves another half step, completing its movement in one indexing operation. This, is turn, permits the vertical plate 77 and the playback heads 60 and 61 to be moved by the spring roller 82 to the next two adjacent traces on the drum. As explained heretofore, this movement of the playback heads to the next traces takes place while they have been swung away from the magnetic tape. Upon completion of the cycle and the return of the bar 92 of its normal position, the playback heads 60 and 61 will be returned to their normal position against the magnetic tape and are in position for picking up the next two traces on the next sequential cycle in the operation of the machine. After the heads 60 and 61 have been moved all the way across the drum 48 and an entire tape is corrected, the heads may be moved back manually against the tension of the reel 82 and will be held in initial position for the correction of a new tape.

Next to be described is the structure utilized in correcting for the normal moveout in connection with the recording and playing back of the signals on the drum 52. This correction involves two factors. The first factor is a function of the earth structure through which the reflections are passing and the relative velocity of sound in the structure. Thus it is a function of time and also the earth structure at different depths. While this is variously characterized in the art, I will refer to it for simplicity herein as the depth factor. The second factor is a function of the relative positions of the seismometers and is commonly referred to in the art as the X factor.

Considering now the control structure involved in correcting for the depth factor for any given value for the X factor, a cam 100, best seen in FIGURE 7, is mounted near the end of the shaft 47 by means of a knurled screw 101. The contour of the cam is controlled by the depth factor which, as explained, is a function of the velocity of the sound in the structures being explored. The contour of the cam when the exploration is in limestone structure, for instance, will be different from the contour of the cam for explorations in shale. Experience in the general locality being explored dictates the shape of the cam for this correction factor as is understood by those skilled in the art.

Referring now to FIGURES 3 and 7, a plate 102 is secured to the support post 43 and has two guide rails 103 and 104 screwed to the outside face at its upper and lower edges. This forms a guideway for a slide 105 on which are mounted four rollers 106. Slide 105 is cut out at the center to leave a shaft-receiving opening 107 so that the slide may pass the shaft 47. Attached to the end of the slide is a cam follower roller 108 which rides on the face of the cam 100. The roller 108 is urged against the face of the cam by means of a pivot arm 109 clamped at its other end to a rock shaft 110 journalled in spaced supporting posts 111. The arm 109 is urged against the roller 108 by counterweights 180 and 180' on opposite sides of the drum 52 through linkage to be described, and in this manner, the arm 109 is oscillated upon each rotation of the shaft 47 and the cam 100.

Carried by the shaft 110 between its bearings 111 is a cradle structure 122, offset from the pivot axis. Mounted on the cradle 122 is a yoke 123 including slotted uprights 124 and 124', forming radius arms. From this point of the description, it should be noted that there are two identical, mechanical linkages, one on the left side of the drum 52, and the other on the right, as viewed in FIGURE 3. Parts on the left hand linkage, at the inner face of the drum bearing corresponding, primed reference character. One of the duplicate linkages controls the playback head 66 and the other the playback head 67 so that these may be moved independently the correct amount, as will be described.

Motion generated by the cam 100 is transmitted to the heads 66 and 67 by a horizontal connecting link 125 (FIGS. 3, 7, 8 and 9) at one end of which is mounted a roller 125a received in the slotted upright 124. On the other end of the connecting link 125 is a roller 125b (FIGURE 8) received in a slot 126 in an extension 127 of a horizontal carrier bar 128. Mounted on the horizontal bar 128 is a rack 129 which engages a gear segment assembly 130 pivoted on the shaft 47. To the gear segment assembly 130 is mounted the counterweight 180 and a swinging radius arm 131 which supports the playback head 66 by means of a spring biased pivot arm 132. Through this linkage it will be seen that the action of the counterweight 180, which is heavier than the arm 131 and the playback head supported thereby, acting through the rack and gear segment 129—130, horizontal bar 128, connecting link 125, and rollers at each end thereof, the radius arms of the yoke 123, cradle 122, shaft 110 and arm 109, the roller 108 is held against the face of the cam 100 as it rotates. It will also be seen that through this same linkage the action of the cam in swinging the arm 109 acts to move the playback supporting arm 131 and 131' along the face of the drum 52 and hence, along the magnetic tape thereon as the drum and the cam rotate. Thus, the playback head 66 is moved relative to the recording surface by the combined motions of the driven drum and the driven playback head, the latter component of this relative movement being determined broadly by the face of the cam.

It will be apparent from an inspection of this linkage that the total amount of the movement of the playback head from one extreme position of the cam to the other will be a function of the position of the link 125 or, more particularly, the position of the roller 125a in the slotted upright 124. Because the cradle 122 has an offset pivot axis, the connecting links 125 and 125' can be individually shifted to points aligned with the pivot axis so that zero motion is imparted to the heads 66 and 67 by the oscillating radius arms. Varying the position will vary the magnitude of the motion of the drive. The mechanism, representing motion modifying linkage, by which the link 125 is positioned will now be described. The adjustment of the link 125 corrects for the X factor.

Referring more particularly to FIGURE 8, the bar 125 is held in position by four rollers 133a, b, c, and d mounted on an H-frame 134 having vertical legs 134a and 134b and a horizontal connector 135. Two uprights 136 and 137 secured to the base by bolts 138 are connected at the top by a cross-bar 139 held in position by screws 140. At the extremities of the side members 134a and b of the H-frame structure are rollers 141a, b, c, and d. These rollers ride against the outer faces of the uprights 136 and 137. Secured to the connector 135 by means of screws 142 is a block 143. The block 143 is threaded to receive a threaded rod or lead screw 144.

From a consideration of this structure it will be seen that as the rod 144 is rotated in either direction the H-frame 134 will be moved up or down, with the rollers 141 riding in tracks at the outside edges of the uprights 136 and 137. The connecting link 125 will be held in any of a plurality of horizontal parallel positions by means of the rollers 133a–d depending on the elevation of the H-frame, and it is free to move transversely in any such position by means of rollers 133a, b, c, and d.

It will be seen that the threaded rod 144 can be turned so as to lower the link 125 to the point where the axis of the roller 125a is in alignment with the axis of the shaft 110, thereby arresting the motion of the link 125 and the playback head 66 in relation to the recording head 65, as described. This position of the link 125 would be utilized if there were no X factor to enter into the correction, such as would be the case if a seismometer were placed directly above the explosive charge 25 or in the event a given trace is to be used as a reference with respect to which the other traces will be corrected. For example, after the traces 12 and 13 are corrected, the bar 125 is raised by means of the threaded bolt 144 only slightly above such center position and is progressively raised as the traces further away from the shot are corrected. The roller 125a will be in its highest position when the outermost traces 1 and 24 are corrected. It will be understood that the X-factor compensation can be introduced into the system periodically from trace to trace and without regard for the cam 100.

There will next be described the mechanism for rotating the threaded rod 144 as part of the programming action of the instrument. The threaded rod 144 is pivoted in the base at 145 (FIGURES 7, 9 and 11) and has a gear 146 secured thereto. A worm 147 also mounted on the rod 144 actuates a dial 148 from which the relative position of the vertically adjustable horizontal bar 125 can be read.

The gear 146 meshes with the gear 149 mounted on shaft 150 which is rotatably journalled in bearings 151 in the base plate and a plate 152 held in position by posts 153 and 154. (FIGURE 11.) Mounted on an extension 150a of the shaft 150 is a ratchet wheel 155. This ratchet wheel is turned in either direction by means of pawl assemblies 156 and 157 having movable teeth 156a and 157a to releasably engage adjacent notches 155a in the ratchet wheel 155. (FIGURE 12.) A spring 158 urges the teeth into the notches. Directly beneath the ratchet wheel 155 is mounted a pawl lifter plate 159 having a handle 159', the details of which are best seen in FIGURE 13, extending therefrom. A raised surface 160 extends over a portion of the periphery of the plate 159 which is formed with a center opening 161 by means of which it is mounted concentrically on the shaft 150a. From this structure it will be seen that when the handle 159' is moved in a clockwise direction, as shown in FIGURE 13, it lifts the tooth 157a out of the notch 155a in the toothed wheel 155 so that movement of the pawl 157 is ineffective to rotate the ratchet wheel 155 and all rotation must be accomplished by the tooth 156a. Similarly, when the handle is moved in a counterclockwise direction, as viewed from FIGURE 13, the pawl 156 is moved so that the tooth 156a cannot seat in the ratchet teeth.

The two pawl assemblies 156 and 157 are mounted for rotation on the shaft 150a and held in position by a collar 162 and a set screw 163. Projecting upwardly from the pawl assemblies 156 and 157 are pins 164 and 165 which coact with a pawl-actuating plate 166. This plate has a square frame structure with a cutaway center 167 to permit it to clear the shaft 150 when it seats on top of the pawl assemblies 156 and 157.

The actuating pelat 166 is provided with two extensions 168 and 169 in its side members into which slots 170 and 171 milled. The pins 164 and 165 extend through the slots. Mounted on the end of the actuating plate 166 is an arm 172 connected to the plunger 173 of a solenoid 174. From this structure it will be seen that upon the actuation of the solenoid the actuating plate 166 will be pulled so as to rotate the pawl 156 in a counterclockwise direction and the pawl 157 in a clockwise direction. Depending which way the handle 159 is turned and whether the two ratchet teeth 156a or 157a are permitted to contact the ratchet wheel 155, the ratchet wheel will be turned in a clockwise or counterclockwise position and, as a result, the threaded rod 144 will be turned so as to raise or lower the horizontal bar 125. The number of the increments of motion of the rod 144 for each ratcheting action between correction of adjacent traces is a function of the spacing between the seismometers with reference to the shot hole and each other.

For the purpose of aligning the cam 100 with the traces on the tape on the drum 48, the shaft 47 is split at 204 (FIG. 3) and collars 205 and 206 are mounted on the ends of the shaft. The shafts are coupled together by an extension 207, and an extension 208 on each collar. The extensions are held together by a bolt 209 and a nut 210. In one extension the bolt passes through a slot so that the extensions and the shafts can be moved relative to each other before the bolt 209 is secured by the nut 210. The extensions also have vernier markings 211 by means of which the movement of the shafts relative to each other can be measured.

After the cam 100 has been secured by the knurled screw 101, the apparatus can be operated and the timing of the cam with the traces can be checked with an oscilloscope. If this is not in phase, the vernier can be employed to make the necessary adjustment.

Referring now to FIGURE 15 illustrating one of the electrical circuits representing the intelligence conduits of the system, it will be assumed, first of all, that the magnetic tape, representing the field tape on which the seismic information described above is recorded, is mounted on the drum 48. The pickup head 60 is mounted in inductive relationship adjacent the drum 48 in alignment with a selected magnetically recorded trace. It will be recalled that the pickup head 60 is mounted on a transverse carrier mechanism (FIGURE 14) by means of which it can be indexed across the face of the drum from trace to trace and also lifted clear of the drum, radially speaking, during every other revolution of the drum. The pickup head 60 (or 61) is coupled through an electrical conduit 175 to an amplifier 175', which can include electronic filters for suppressing noise, and the output of which is coupled by a conduit 176 to a recording head 64 mounted in inductive relationship with the recording surface of the drum 52, representing the correction drum of the system.

Mounted in alignment with the recording head 64 (or 65) and circumferentially spaced therefrom is the pickup head 66 (or 67) which, it will be recalled, is movable circumferentially of the drum 52 as a function of the depth factor and the X factor by means of the control mechanism described above having reference to FIGURES 8, 9, 11 and 12.

The output of the circumferentially movable pickup head 66 is coupled to an amplifier 176', through a conduit 177, the output of which is connected by a conduit 177' to the movable contact 178' of a stepping switch indicated generally by the numeral 178.

The stepping switch 178 includes a series of contacts 179–1, 179–2 . . . 179–12, respectively connected by electrical conduits 180–1, 180–2 . . . 180–12 to fixed recording heads series 69, including heads 181–1, 181–2 . . . 181–12 mounted in inductive, recording relationship adjacent the face of the drum 53 on which the final, corrected seismic traces are recorded.

The stepping switch 178 is energized by a winding 182 at the end of each complete cycle (every other revolution) of the drum assembly 48, 52 and 53. This is accomplished through a circuit including a power source 183, an electrical conductor 184, the winding 182 and a normally open switch 185 adapted to be closed by a lug 186' on the gear 89 once for each rotation of that gear. In this fashion, upon each rotation of the gear 89, the switch 185 is closed to energize the stepping switch 178 to move the contact 178' to the next contact so that the next corrected trace to be recorded on the final drum 53 will be made by the next adjacent recording head 181. At the conclusion of the recording of all traces, the contact 178' is returned to its initial position by manual means.

For purposes of clarity, the second pickup head 61 has been omitted from the drum 48, as have the second recording and pickup heads 65 and 67 associated with the correction drum 52. The latter three heads represent a duplicate intelligence conduit having a circuit layout which can be identical to that illustrated in FIGURE 15. It will be understood that the system can operate with one intelligence conduit, as illustrated in FIGURE 15, or with two intelligence conduits, representing duplications of the first in accordance with the system shown elsewhere in the drawings. Three or four intelligence conduits might also be used in accordance with the present invention in the event the total number of traces on a given seismic log justified its use.

The manner in which the signals from the playback heads 66 and 67 are recorded on the magnetic tape on the drum 53 will now be described more particularly in connection with FIGURES 3 and 5. A recording head assembly 70′ has mounted in it two sets of recording heads 69 and 70. The entire recording head bank including the frame 70′ is pivotally mounted at 203 so that the bank may be swung away from the drum to facilitate mounting the magnetic tape thereon. In each of the banks of recording heads 69 and 70 are 12 recording heads for recording the traces plus such additional information which is not concerned with the invention. By a switching arrangement shown in FIGURE 15 and described above, the appropriate recording heads in the bank 69 and 70 are connected to the playback heads 66 and 67. For instance, assuming that the first two traces to be corrected are 1 and 13, which are the two traces in the left-most position on drum 48 as viewed in FIGURE 4, the output of playback heads 66 and 67 would be fed into the recording heads 181–1 (FIGURE 15) and the corresponding head (not shown) in the bank 70 corresponding to the seismometer 13 of FIGURE 1; when the playback heads 60 and 61 are indexed to the next position so as to pick up traces 2 and 14, the output of the playback heads 66 and 67 are connected to next adjacent recording heads in a similar manner all the way across the width of the tape.

The structure utilizing only two playback heads 60 and 61 which are sequentially indexed across the width of the tape, as contrasted with a bank of 24 pickup heads held in fixed position has the advantage that the system can be used more readily with field tapes which are recorded by either amplitude modulation (AM) or frequency modulation (FM). Since these two types of recordings take different types of heads, it is necessary to change only two of the heads to shift from one type of modulation to the other. It will be understood in this connection that amplifiers between stages can include means to convert between FM and AM. Many field records are now rendered by FM and it is possible to operate the system in FM throughout. It is preferred for certain situations, however, to convert the FM signal to AM for purposes of the correction stage at the drum 52. Using AM at this point, it is possible to introduce the corrective information either at the pickup heads 66, 67 as described above, or at the recording heads 64, 65.

In the apparatus described above having reference in particular to FIGURES 8, 9, 11 and 12, it will be recalled that compensations are introduced into the seismic traces which are a function of the spacing of the seismometers 1 through 24 from the shot 25. To this end, the solenoid 174 (FIGURE 12) would be actuated a given number of times between each cycle of operation to operate the threaded rod 144 to index the slide member 125 upwardly or downwardly in the yoke 123, in this fashion introducing compensations for the X factor or the distances of the seismometers from the shot hole. In the event the distances between the seismometers are not equal, as might be caused by unusual terrain, rivers or the like, or if there are other inequalities requiring correction, different X factor compensations may be made between the corresponding trace corrections. In such cases, the solenoid 174 would be energized more or less times between trace corrections, depending upon the distance between the seismometers and the other factors, to actuate the ratchet mechanism to displace the horizontal member 125 a different distance in the slotted arm of the yoke 123.

To carry out the necessary programming action to introduce automatically the necessary compensations between successive trace corrections, the programming system of FIGURE 16 is used. The programming system includes an oscillator 187 connected to a first gate circuit 188 connected in turn to a second gate circuit 189, the output of which is connected through a conductor 190 to a relay 191, the output of which is connected through a suitable source of power to the solenoid winding 174. A trigger circuit 192 is connected to the first gate circuit 188, the trigger circuit being energized through a starting switch 193, actuated by a cam 186″ on the gear 89. The output of the second gate circuit 189 is also connected by a conduit 194 to unit and tens counters 195, the output of which is connected to a coincidence amplifier 196. Also connected to the coincidence amplifier 196 through a stepping switch 197 having a movable contact 197′ is a programming control 198 in which the information representing the distances between successive seismometers is stored. The arrangement is such that the first contact 199–1 is connected to an information source, such as an electro-magnetic memory for example, corresponding to the distance between the seismometer 1 and the shot hole 26, with successive contacts 199–2 . . . 199–12 being connected to distance information representative of the positions of the seismometers 2 . . . 12 respectively. The operation of coincidence amplifier is such that an output signal is generated at the time the input signals from the contacts 195 correspond to the information derived from programming control 198. The output of the coincidence amplifier is connected by conduit 200 to the second gate circuit 189 to operate as a stopping signal to block the output of the oscillator 187 to the solenoid 174. At this time, the apparatus is conditioned to perform a corrective trace. Prior to the beginning of the next corrective trace operation, the counters 195 are reset by a reset circuit including the conduit 201 and a reset switch 202, operated by a cam 186 on the gear 89. Also, the stepping switch 197 is energized to step the movable contact 197′ to the next contact, after which the starting switch 193 is closed to trigger the gate circuit 188 to start the next flow of signals to the solenoid 174 to set the system with the proper corrective value for the next seismic trace. In FIGURE 16, only one system is shown, but if two traces are to be connected simultaneously as in the illustrated embodiment, the circuit, or a portion thereof, will be duplicated.

I am aware that it has been proposed heretofore to correct all of the channels simultaneously by having a series of pickup heads relatively movable for the purpose of correcting the normal moveout. In such a structure, however, the pickup heads will, of necessity, have to be moved relative to each other because of the X factor explained heretofore, and because of their close spacing this creates cross feed, mechanical and electrical disturbances, which introduces errors into the corrected signals. In accordance with my invention, however, by correcting only one, two or a small number of the traces at a time, the correcting heads may be placed far apart from each other and in this way there is no possibility of disturbance, and the purity of each trace is retained without any possibility of error being introduced.

While the invention has been described above, having reference to preferred arrangement thereof, it will be understood that it can take various other forms and arrangements. The invention should not, therefore, be regarded as limited except as defined by the following claims.

I claim:
1. Apparatus for correctively modifying a recorded trace record of a seismic prospecting operation, comprising a rotatable cylindrical member adapted to carry a trace record, said member having associated therewith movable transducing means including a scanning means and a recording means, means to rotate said cylindrical member, moving means to move one of said scanning and recording means circumferentially of said cylindrical member while in transducing relationship therewith, said moving means comprising a cam, a follower for the cam and coupling means to couple said follower to said one of said scanning and recording means; said coupling means including a radius arm movable about a pivot, a connecting link having one end attached to and adjustably movable along the length of said radius arm, and motion modifying means comprising an adjustable support attached to said connecting link operative to adjust the latter through a range of positions along the length of said radius arm.

2. Apparatus as set forth in claim 1, including second radius arm means movable with the first and a second connecting link between the second radius arm and the movable transducing means, and a second motion modifying means to shift the point of connection between the second connecting link and the second radius arm means whereby said cam drives the first and second radius arms as a function of a variable and whereby the driving movement imparted thereby to the movable transducing means is individually and relatively modifiable as a function of a second variable.

3. Apparatus as set forth in claim 2, including a common support for the two radius arms offset from the pivots axis thereof, said radius arms thereby passing through the pivot axis, whereby the points of connection between said connecting links and the respective radius arms can be moved into register with the pivot axis to reduce to zero the motion imparted by the oscillating radius arms to the connecting links and hence to the movable transducer means.

4. Apparatus for reproducing and recording a trace record of a seismic prospecting operation, comprising a first rotatable member having a cylindrical surface adapted to carry an original, reproducible trace record having a plurality of complementary traces thereon; a second rotatable member having a cylindrical surface adapted to carry a final, reproduced trace record; a first transducer means mounted in scanning relation with said first rotatable member; a support for said first transducer means movable with a component of motion parallel to the axis of rotation of the cylindrical surface of said first rotatable member; means to move said support away from the cylindrical surface of said first rotatable member; indexing means to shift said support by increments equivalent to the distances between adjacent complementary traces on said record; means to actuate said indexing means periodically whereby said first transducer means sequentially encounters and scans each of the complementary traces; means responsive to rotation of the cylindrical surface of said first rotatable member to concurrently displace said support away from the cylindrical surface and to actuate said indexing means; a second transducer means mounted in recording transducing relationship with said second rotatable member; and electrical connections between said first and second transducer means, whereby traces sequentially scanned at said first rotatable member can be recorded at said second rotatable member.

5. Apparatus as set forth in claim 4, said indexing means including spring means to urge the support in one direction of motion, and ratchet means to hold the support against the spring force and operable to release the support for advancing movement by a predetermined distance controlled by the ratchet means for each actuation.

6. In apparatus for correctively modifying the recorded trace record of a seismic prospecting operation, including a rotatable member having a cylindrical surface and adapted to carry a reproducible trace record, means to rotate said member, transducer means operatively associated with said member said transducer means including a transducer and a swingable transducer support in the form of an arm swingable about the axis of rotation of said rotatable member; improved means for moving said transducer means circumferentially of said cylindrical surface comprising a cam driven with said rotatable member; a cam follower operatively associated with said cam; first guide means to constrain said follower to move in a predetermined direction; an oscillatable, pivoted follower arm driven by said follower; radius arm means secured to said follower arm and oscillatory therewith; a connecting link oscillatively driven by said radius arm means; second guide means to constrain said connecting link to move in a predetermined direction; an adjustable third guide means supporting said second guide means and associated connecting link for movement generally transversely of the direction of oscillative movement of the connecting link; whereby said connecting link is movable lengthwise of said radius arm means, to change the amplitude of the oscillative motion imparted thereto; and means coupling said connecting link to said transducer support arm to displace the transducer relative to said cylindrical surface for a predetermined interval necessary to effect the desired correction said coupling means includes movable gear means connected to said link, mating gear means rotatably secured to the axis of rotation of said rotatable member, and means connecting said mating gear means to said transducer support arm.

7. The apparatus set forth in claim 6 wherein said adjustable third guide means includes a lead screw; screw turning means including reversing means to selectively turn the screw in either direction by predetermined increments; means to actuate said turning means; and programming means whereby the amplitude of oscillative motion imparted to said connecting link can be varied according to a predetermined program.

8. Apparatus as set forth in claim 6, including counterweight means supported by mating gear means to yieldably urge the follower arm against the cam follower.

References Cited in the file of this patent
UNITED STATES PATENTS

| | | |
|---|---|---|
| 2,243,730 | Ellis | May 27, 1941 |
| 2,440,971 | Palmer | May 4, 1948 |
| 2,604,955 | Hawkins | July 29, 1952 |
| 2,683,254 | Anderson et al. | July 6, 1954 |
| 2,721,990 | McNaney | Oct. 25, 1955 |
| 2,733,425 | Williams et al. | Jan. 31, 1956 |
| 2,800,639 | Lee | July 23, 1957 |
| 2,802,201 | Casagrande | Aug. 6, 1957 |
| 2,803,515 | Begun | Aug. 20, 1957 |
| 2,821,892 | Merten | Feb. 4, 1958 |
| 2,825,885 | Reynolds | Mar. 4, 1958 |
| 2,851,122 | McCollum | Sept. 9, 1958 |
| 2,876,428 | Skelton | Mar. 3, 1959 |
| 2,886,795 | Thatcher | May 12, 1959 |